UNITED STATES PATENT OFFICE.

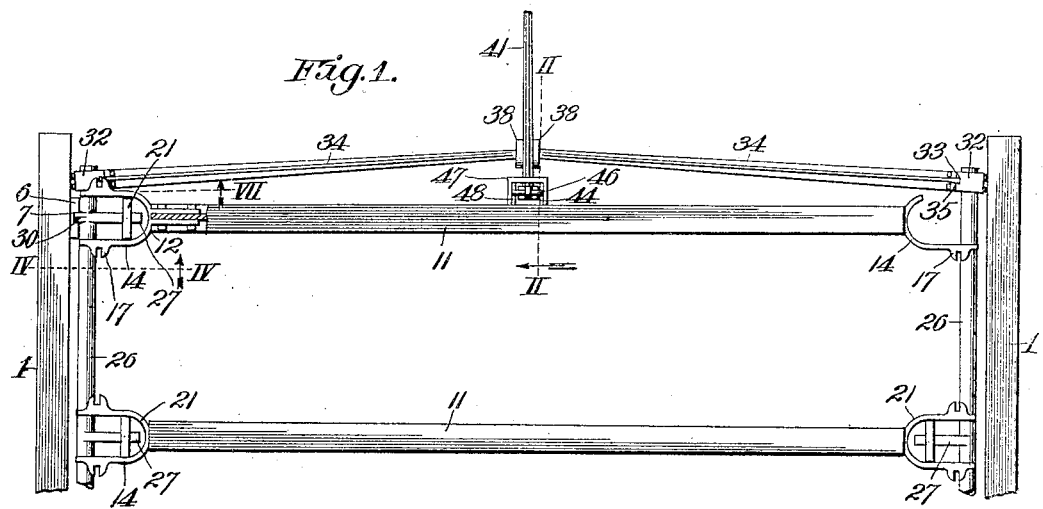
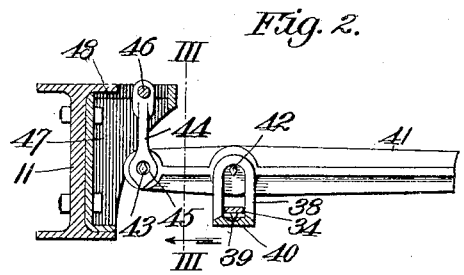
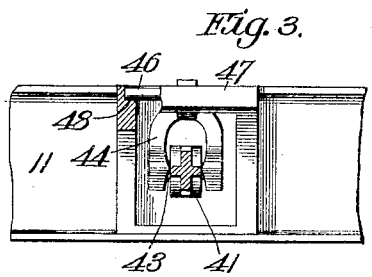
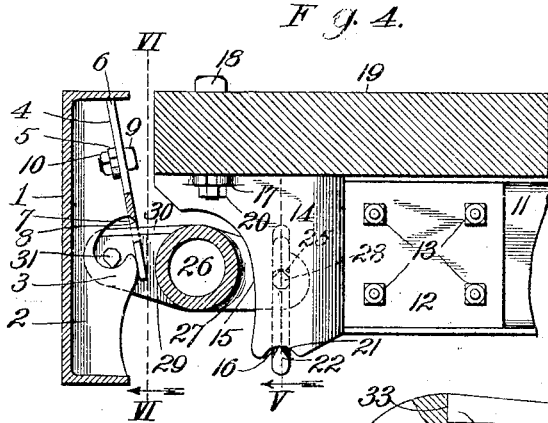
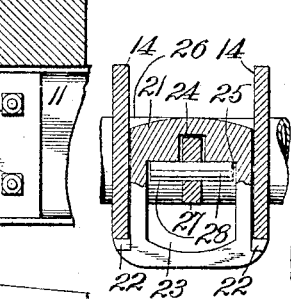
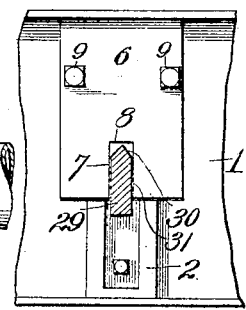

DARIUS M. ORCUTT, OF KANSAS CITY, KANSAS.

WEIGHING-SCALE.

No. 804,164.  Specification of Letters Patent.  Patented Nov. 7, 1905.

Application filed March 23, 1905. Serial No. 251,541.

*To all whom it may concern:*

Be it known that I, DARIUS M. ORCUTT, a citizen of the United States, residing at Kansas City, in the county of Wyandotte and State of Kansas, have invented certain new and useful Improvements in Weighing-Scales, of which the following is a specification.

My invention relates to weighing-scales, and more particularly to that class known as "pitless" wagon-scales; and my object is to produce a scale of this character in which the bearings are protected from dirt, sand, snow, and ice.

A further object is to provide a scale with a protected bearing which does not interfere with the necessary end swing or vibratory motion of the platform.

A still further object is provide a scale with a self-adjustable fulcrum-hanger for the cross-lever to allow the loops connecting said cross-lever with the rock-lever arms, to assume and maintain a "plumb" position.

With these objects in view the invention consists in certain novel and peculiar features of construction and organization, as hereinafter described and claimed, and in order that it may be fully understood reference is to be had to the accompanying drawings, in which—

Figure 1 is a top plan view with the platform omitted and partly broken away and in section of a part of a scale embodying my invention. Fig. 2 is an enlarged section taken on the line II II of Fig. 1 and also showing one of the loop-hangers partly broken away. Fig. 3 is a section on the line III III of Fig. 2 and with part of the bracket broken away. Fig. 4 is a section, on a still greater scale, taken on the line IV IV of Fig. 1. Fig. 5 is a section taken mainly on the dotted line V of Fig. 4. Fig. 6 is a section taken on the line VI VI of Fig. 4. Fig. 7 is a section taken mainly on the dotted line VII of Fig. 1 and partly broken away, said figure being on the same scale as Figs. 4 to 6, inclusive.

In the said drawings, where like reference characters refer to corresponding parts, 1 indicates the end beams of the scale-frame, the same being rigidly supported in any suitable manner. Near the ends of said beams and at their inner sides are secured castings 2 of U shape in cross-section and provided with upwardly-disposed bearing-hooks 3 and having their inner edges above said bearing-hooks sloping downwardly and inwardly, as at 4, and provided with laterally-projecting bifurcated lugs 5.

6 indicates guard-plates which fit snugly against the sloping edges 4 of bearing-castings 2 and have their lower ends bridging the openings of said hooks, as shown most clearly in Fig. 4, so that dirt, snow, or ice dropping down between the platform, hereinafter referred to, and beams 1 shall be prevented from falling in and accumulating on the concave or bearing surfaces of hooks 3, the bridging portions of said guard-plates, one only of which appears, being bifurcated centrally, as at 7, and having the upper end of the bifurcation sharpened, as at 8, for a purpose which hereinafter appears. Bolts 9 extend through said guard-plate and bifurcated lugs 5 to secure the former reliably in position, nuts 10 engaging the threaded ends of the bolts to retain the latter reliably in position.

11 indicates the longitudinal joists or I-beams, of which there may be two or three. The drawings show a scale having three joists or I-beams—two side ones, one only appearing, and a central one.

12 indicates castings having their inner ends bifurcated and fitting snugly on the web portions of the ends of the I-beams and bolted thereto, as at 13, and their outer ends provided with a wide bifurcation, so as to form the outwardly-projecting arms 14, said arms being recessed in their outer edges, as at 15, and provided in their lower edges with bearing-cavities 16. Said arms at their upper edges are provided with laterally-projecting bifurcated lugs 17 to receive bolts 18, extending down through the platform 19, only one plank of which appears, (see Fig. 4,) retaining-nuts 20 engaging the lower ends of said bolts.

21 indicates hangers fitting snugly between arms 14 of the bifurcated castings and having outwardly-projecting bearing-arms 22 engaging the bearing-recesses 16 of said bifurcated castings. Said hangers are provided with wide openings 23 and centrally with narrow openings 24, communicating with openings 23 at the upper edge of the same, as shown clearly in Fig. 5, and 25 represents concave bearing-recesses in the lower edge of the upper wall of openings 23.

26 indicates the rock-shafts disposed at the inner sides of and parallel with beams 1 and provided with inwardly-projecting arms 27, projecting through openings 23 and 24 of hangers 21, and provided with laterally-projecting bearing-arms 28, engaging the bearing-recesses 25, formed in the upper walls of openings 23 of the hangers. The rock-shafts in line with the side joists or beams 11 are also provided with outwardly-projecting arms 29, which project through the bifurcations 7 of the guard-plates and between the arms of the U-shaped castings 2 of beams 1. Said arms have their upper edges sharpened, as at 30, and are provided with laterally-projecting bearings 31, engaging and fulcruming upon the hooks 3 of said castings. It is obvious that the rock-shaft may be likewise provided with arms 29 in line with the central joist or beam 11; but such equipment is not necessary at this point and is therefore undesirable from an economical standpoint. Secured rigidly on the ends of the rock-shafts are collars 32, provided in their upper inner edges with notches 33 to receive the projections 35 of the arms 34, said arms being preferably of the ribbed type to give the necessary strength without unnecessary weight, the base-flanges of said arms having lugs 36 bearing squarely against and bolted, as at 37, to the collars 32. Said arms extend longitudinally, but are disposed a greater distance from the side of the contiguous joists or beams 11 at their inner than at their outer ends, being thus disposed at an angle to avoid having the rock-shafts of unnecessary length. The inner ends of said arms fit, respectively, in the loops or stirrups 38 and have bearing-points 39 engaging cavities 40 in the base portions of said loops or stirrups which hang from the laterally-projecting bearing-arms 42 of the cross-lever 41, adapted to be connected at its free end to the scale-beam mechanism in the usual or any preferred manner and equipped at its opposite end with bearing-arms 43, engaging the bearing-holes 45 in the hanger 44, pivotally suspended from the roller 46, resting at its ends upon the upwardly-disposed trackways 48 of a bracket 47, rigidly bolted to and projecting from the adjacent joist or beam 11. By this arrangement it will be apparent that if in the assemblage of the parts of the scale in operative relation the arms 34 are secured on the rock-shafts a little too far from or a little too near to the contiguous rock-shaft arms 27 and 29 and in consequence the inner ends of said arms 34 are disposed too far from or too near to the contiguous joist or I-beam, the roller 46 will automatically roll outward or inward, respectively, on trackways 48, and therefore insure a plumb position for hanger 44 and the bearing loops or stirrups, the adjustment of said roller being automatic, as will be readily understood. If the hanger 44, under the conditions named, was rigid, it is obvious that said bearing loops or stirrups would stand at an angle to the perpendicular, and therefore impose an undesirable lateral strain on either of the parts, even if the balance of the scale was not affected.

It will be obvious, as hereinbefore stated, that the guard-plates prevent an accumulation of dirt, sand, snow, or ice upon the bearing-hooks and that by reason of the sharpened upper edge of bifurcations 8 and the coöperating sharpened edge of the rock-arms 29 any clods of dirt, pieces of wood, or frozen particles lodging between said edges 30 and 8 will be easily and reliably crushed and dropped to the ground between the guard-plates and the rock-shafts. The guard-plates, together with said coöperating sharpened edges therefor, will eliminate the necessity, which often arises with this class of scale, particularly in the winter-time, of removing the platform in order to give access to certain of the bearings for the purpose of removing particles which render the scale less sensitive, and therefore affect its accurate weighing, and which in some cases absolutely prevent the operation of the scale.

From the above description it will be apparent that I have produced a weighing-scale possessing the features of advantage enumerated as desirable and which obviously is susceptible of modification in its form, proportion, detail construction, and arrangement of the parts without departing from the principle of construction involved or sacrificing any of its advantages.

Having thus described the invention, what I claim as new, and desire to secure by Letters Patent of the United States, is—

1. In a weighing-scale, an end beam, upwardly-disposed hooks carried thereby, a rock-shaft having outwardly-projecting arms fulcrumed on said hooks, and inwardly-projecting arms, hangers pivotally suspended from the inwardly-projecting arms to swing toward or from the end beam, longitudinal joists or beams supported by said hangers for endwise vibration therewith, a platform mounted upon said joists or beams, and guard-plates secured to the end beams and having bifurcations or slots in their lower ends fitting over the outwardly-projecting arms of the rock-shaft.

2. In a weighing-scale, an end beam, upwardly-disposed hooks carried thereby, a rock-shaft having outwardly-projecting arms fulcrumed on said hooks, and inwardly-projecting arms, hangers pivotally suspended from the inwardly-projecting arms to swing toward or from the end beam, longitudinal joists or beams supported by said hangers for endwise vibration therewith, a platform mounted upon said joists or beams, and guard-plates secured to the end beam and sloping downwardly and inwardly therefrom and having bifurcations or slots in their lower ends fitting over the outwardly-projecting arms of the rock-shaft; that portion of the plate forming the upper edge of the bifurcation or slot being sharpened.

3. In a weighing-scale, a beam, upwardly-disposed hooks carried by and secured at the inner sides of the same and open at the side inward of or remote from the beam, a rock-shaft having arms projecting outwardly and equipped with bearings fulcrumed on said hooks, arms projecting inwardly from the rock-shaft, a platform supported from and above said inwardly-projecting arms of the rock-shaft, guard-plates sloping downwardly and inwardly and bridging the open inner side of the hooks and provided with bifurcations or slots in their lower ends fitting over the outwardly-projecting rock-shaft arms.

4. In a weighing-scale, a beam, upwardly-disposed hooks carried by and secured at the inner sides of the same and open at the side inward of or remote from the beam, a rock-shaft having arms projecting outwardly and sharpened at their upper edges, and equipped with bearings fulcrumed on said hooks, arms projecting inwardly from the rock-shaft, a platform supported from and above said inwardly-projecting arms of the rock-shaft, guard-plates sloping downwardly and inwardly and bridging the open inner side of the hooks and provided with bifurcations or slots in their lower ends fitting over the outwardly-projecting rock-shaft arms; that portion of each guard-plate at the upper end of its bifurcation being sharpened.

5. In a weighing-scale, end beams, rock-shafts at the inner sides of and parallel with the end beams and fulcrumed thereon, arms projecting inwardly from the rock-shafts and provided with laterally-projecting bearing-arms, hangers fitting over said inwardly-projecting arms and fulcrumed on side laterally-projecting bearing-arms, and provided with outwardly-projecting bearing-arms, longitudinal joists or beams, brackets secured to said beams and provided with bearing-cavities resting on the outwardly-projecting arms of the hangers, and a platform supported by said joists or beams.

6. In a weighing-scale, end beams, rock-shafts supported from said beams, a platform structure suitably supported from the rock-shafts, arms projecting from the rock-shafts, a cross-lever sustaining the downward pressure of said arms, and a vertical hanger forming a fulcrum for the cross-lever and suspended from the platform structure and bodily self-adjustable in a horizontal plane in a direction parallel with the rock-shafts.

7. In a weighing-scale, end beams, rock-shafts having arms fulcrumed on said beams, a platform supported from and inward of said rock-shafts, arms projecting inwardly from the ends of the rock-shafts, a cross-lever, loops or stirrups suspended therefrom and engaged by the inner ends of said arms, and a hanger uniting the cross-lever to the platform and self-adjustable transversely of the latter.

8. In a weighing-scale, end beams, rock-shafts having arms fulcrumed on side beams, a platform supported from and inward of said rock-shafts, arms projecting inwardly from the ends of the rock-shafts, a cross-lever, loops or stirrups suspended therefrom and engaged by the inner ends of said arms, a bracket rigid with the platform and having trackways extending transversely thereof, a roller mounted on said trackways, and a hanger suspended from said roller and forming a fulcrum for the contiguous end of the cross-lever.

9. In a weighing-scale, end beams, rock-shafts supported from said beams, a platform structure suitably supported from the rock-shafts, arms projecting from the rock-shafts, a cross-lever sustaining the downward pressure of said arms, a roller supported by the platform structure and adapted to roll in the direction of the length of the cross-lever, and a hanger forming a fulcrum for the cross-lever and pivotally suspended from said roller and adapted to swing in the direction of the length of the cross-lever.

In testimony whereof I affix my signature in the presence of two witnesses.

DARIUS M. ORCUTT.

Witnesses:
H. C. RODGERS,
G. Y. THORPE.